United States Patent
Miyaura

(10) Patent No.: US 12,423,908 B2
(45) Date of Patent: Sep. 23, 2025

(54) INFORMATION PROCESSING APPARATUS, INFORMATION PROCESSING METHOD, AND NON-TRANSITORY COMPUTER-READABLE MEDIUM

(71) Applicant: CANON KABUSHIKI KAISHA, Tokyo (JP)

(72) Inventor: Takashi Miyaura, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 132 days.

(21) Appl. No.: 18/404,998

(22) Filed: Jan. 5, 2024

(65) Prior Publication Data
US 2024/0242422 A1     Jul. 18, 2024

(30) Foreign Application Priority Data
Jan. 16, 2023 (JP) ................. 2023-004704

(51) Int. Cl.
*G06T 15/20*     (2011.01)
*H04S 7/00*      (2006.01)

(52) U.S. Cl.
CPC ............... *G06T 15/20* (2013.01); *H04S 7/30* (2013.01); *H04S 2400/13* (2013.01)

(58) Field of Classification Search
None
See application file for complete search history.

(56) References Cited

U.S. PATENT DOCUMENTS

| | | | |
|---|---|---|---|
| 2020/0236487 A1* | 7/2020 | Kratz | H04R 5/02 |
| 2022/0126206 A1* | 4/2022 | Rossi | G06Q 30/0251 |
| 2023/0350222 A1* | 11/2023 | Castleman | G09G 3/003 |
| 2023/0413003 A1* | 12/2023 | Smith | H04S 7/303 |
| 2023/0421984 A1* | 12/2023 | Edwards | H04S 3/008 |

FOREIGN PATENT DOCUMENTS

| | | |
|---|---|---|
| JP | 2019-036790 A | 3/2019 |
| JP | 2022-012034 A | 1/2022 |

* cited by examiner

*Primary Examiner* — Frank S Chen
(74) *Attorney, Agent, or Firm* — Carter, DeLuca & Farrell LLP

(57) ABSTRACT

An information processing apparatus is provided. The apparatus obtains information specifying a virtual viewpoint in a three-dimensional space in which one or more models and one or more virtual sound sources are placed. The apparatus manages sound data corresponding to each of the one or more virtual sound sources. The apparatus generates a virtual viewpoint image of the three-dimensional space based on the virtual viewpoint. The apparatus outputs the virtual viewpoint image and the sound data corresponding to a model, among the one or more models, that appears in the virtual viewpoint image and at least one virtual sound source among the one or more virtual sound sources.

17 Claims, 8 Drawing Sheets

F I G. 2

| No. | Position | Rotation | Scale | OBJECT | CG/MATERIAL | Audio |
|---|---|---|---|---|---|---|
| 0 | (5, 15, 10) | (15, 0, 0) | (1, 1, 1) | water.obj | water.png | water.wav |
| 1 | (5, 10, 10) | (-5, 0, 0) | (1, 1, 1) | drink.obj | drink.png | drink.wav |
| 2 | (10, 5, 15) | (30, 0, 0) | (1, 1, 1) | None | None | candy.wav |
| ... | ... | ... | ... | ... | ... | ... |
| (n-1) | (0, 0, 0) | (0, 90, 0) | (1, 1, 1) | logo.obj | logo.png | logo.wav |

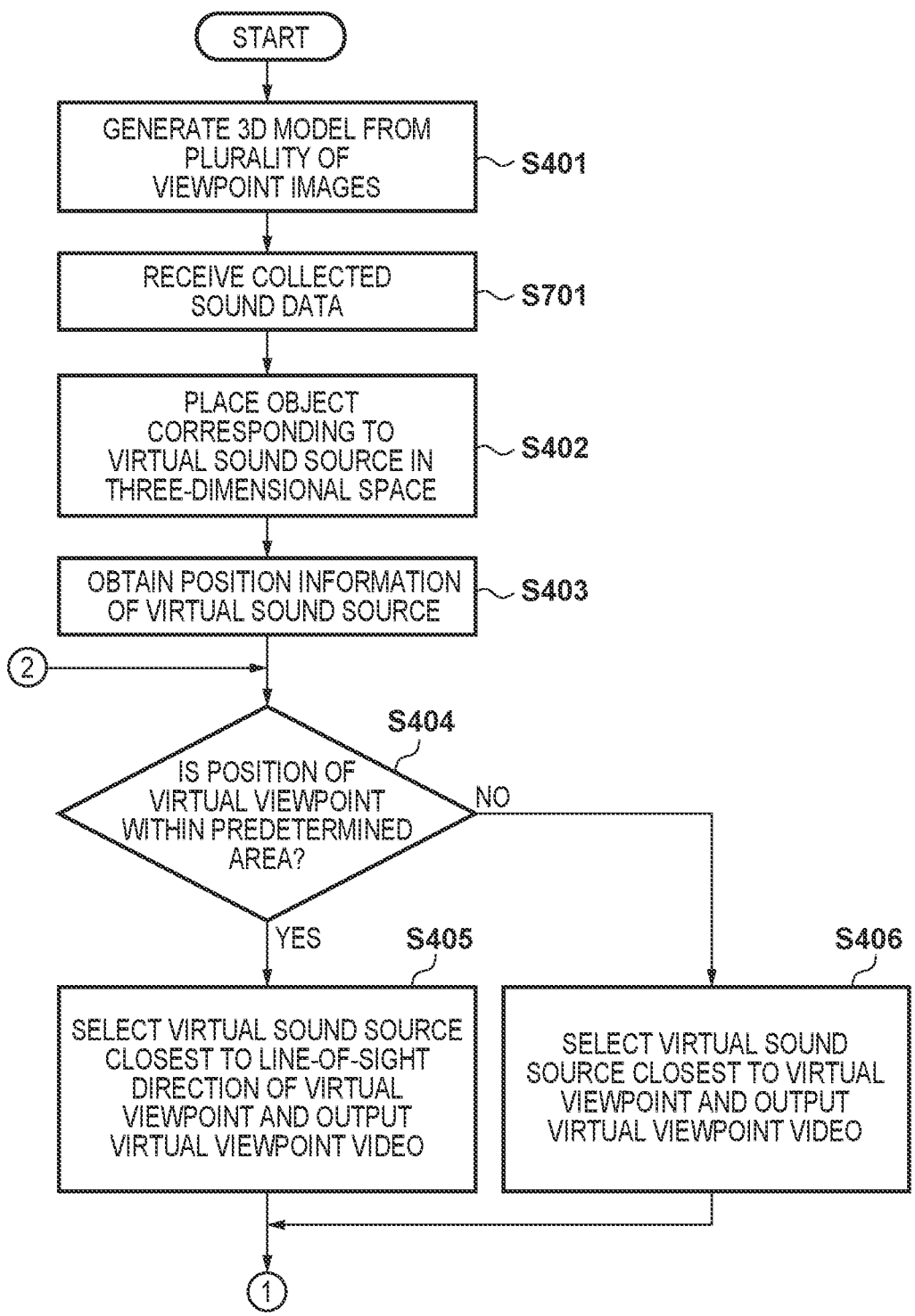
F I G. 7A

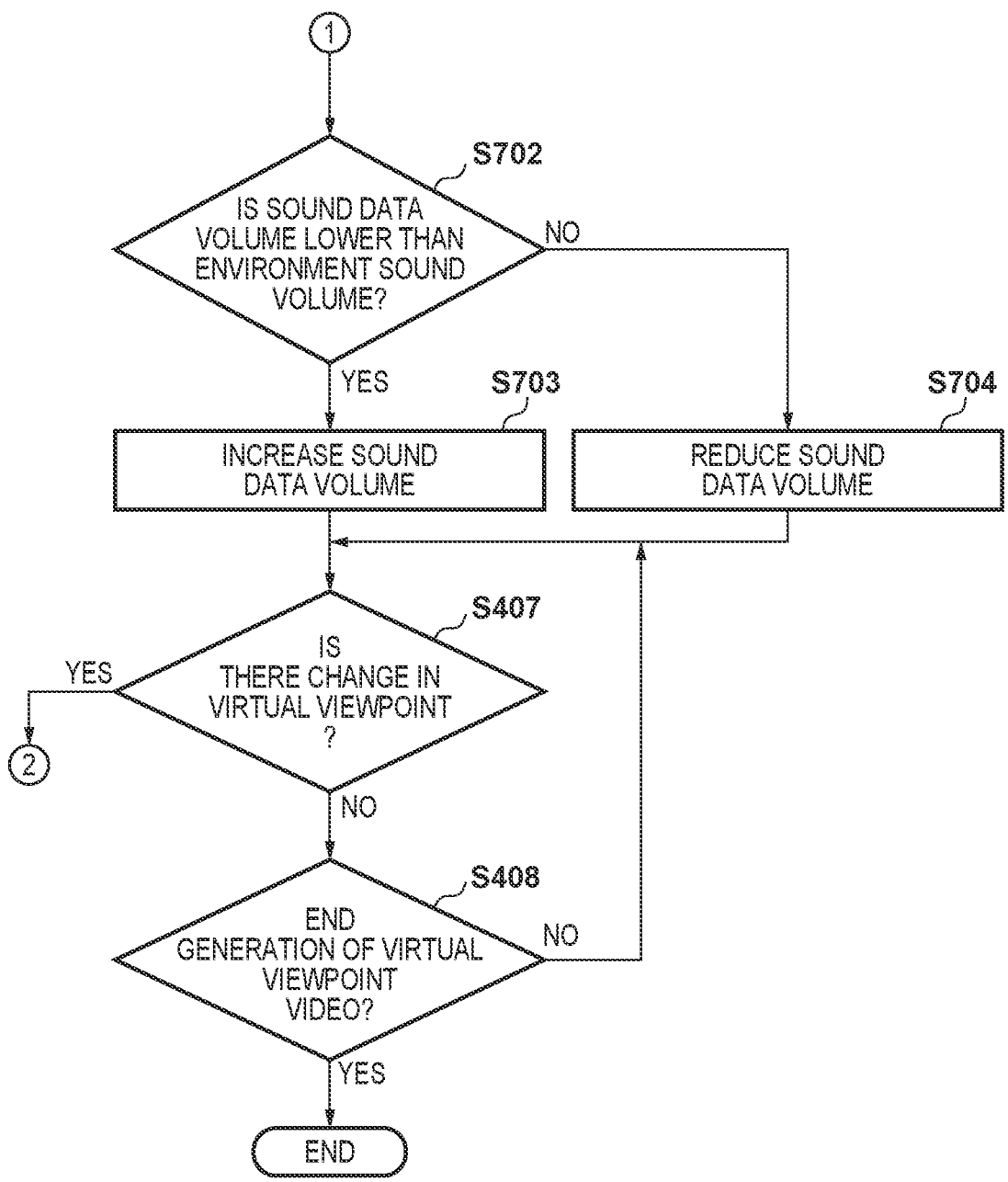

INFORMATION PROCESSING APPARATUS, INFORMATION PROCESSING METHOD, AND NON-TRANSITORY COMPUTER-READABLE MEDIUM

BACKGROUND

Field

The present disclosure relates to an information processing apparatus, an information processing method, and a non-transitory computer-readable medium, and particularly relates to a technique for generating virtual viewpoint video accompanied with sound data.

Description of the Related Art

Techniques for generating a virtual viewpoint image seen from a virtual viewpoint in a three-dimensional space are attracting attention. Such a three-dimensional space can be constructed based on a plurality of captured images of a subject (e.g., Japanese Patent Laid-Open No. 2019-36790). For example, a plurality of captured images of a subject in a real space can be obtained using image capturing apparatuses such as cameras disposed at a plurality of different locations. Then, an image processing unit such as a server can construct a 3D model of the subject based on the plurality of captured images. The image processing unit can also perform processing for rendering a virtual viewpoint image based on the 3D model of the subject and the virtual viewpoint. The obtained virtual viewpoint image is then delivered to a user terminal and displayed in the user terminal. Such a configuration makes it possible for a user to observe the subject from a variety of angles. A virtual viewpoint video constituted by a plurality of virtual viewpoint images can also be generated using such a technique.

Meanwhile, the delivery of advertisements in virtual reality spaces is also attracting attention. For example, Japanese Patent Laid-Open No. 2022-12034 relates to a technique in which a user controls an avatar in a virtual reality space. According to Japanese Patent Laid-Open No. 2022-12034, audio data such as advertisements are output to the user according to whether the user's avatar corresponds to a target. Specifically, the delivery of advertisement audio data is controlled according to the area where the avatar is located, attributes of the avatar, and the like.

SUMMARY

According to an embodiment, an information processing apparatus comprises one or more memories storing instructions and one or more processors that execute the instructions to: obtain information specifying a virtual viewpoint in a three-dimensional space in which one or more models and one or more virtual sound sources are placed; manage sound data corresponding to each of the one or more virtual sound sources; generate a virtual viewpoint image of the three-dimensional space based on the virtual viewpoint; and output the virtual viewpoint image and the sound data corresponding to a model, among the one or more models, that appears in the virtual viewpoint image and at least one virtual sound source among the one or more virtual sound sources.

According to another embodiment, an information processing method comprises: obtaining information specifying a virtual viewpoint in a three-dimensional space in which one or more models and one or more virtual sound sources are placed; managing sound data corresponding to each of the one or more virtual sound sources; generating a virtual viewpoint image of the three-dimensional space based on the virtual viewpoint; and outputting the virtual viewpoint image and the sound data corresponding to a model, among the one or more models, that appears in the virtual viewpoint image and at least one virtual sound source among the one or more virtual sound sources.

According to still another embodiment, a non-transitory computer-readable medium stores a program executable by a computer to perform a method comprising: obtaining information specifying a virtual viewpoint in a three-dimensional space in which one or more models and one or more virtual sound sources are placed; managing sound data corresponding to each of the one or more virtual sound sources; generating a virtual viewpoint image of the three-dimensional space based on the virtual viewpoint; and outputting the virtual viewpoint image and the sound data corresponding to a model, among the one or more models, that appears in the virtual viewpoint image and at least one virtual sound source among the one or more virtual sound sources.

Further features of the present disclosure will become apparent from the following description of exemplary embodiments (with reference to the attached drawings).

BRIEF DESCRIPTION OF THE DRAWINGS

FIG. 2 is a diagram illustrating the data structure of data corresponding to a virtual sound source.

FIGS. 7A-7B are a flowchart illustrating an information processing method according to an embodiment.

DESCRIPTION OF THE EMBODIMENTS

Figure 1:
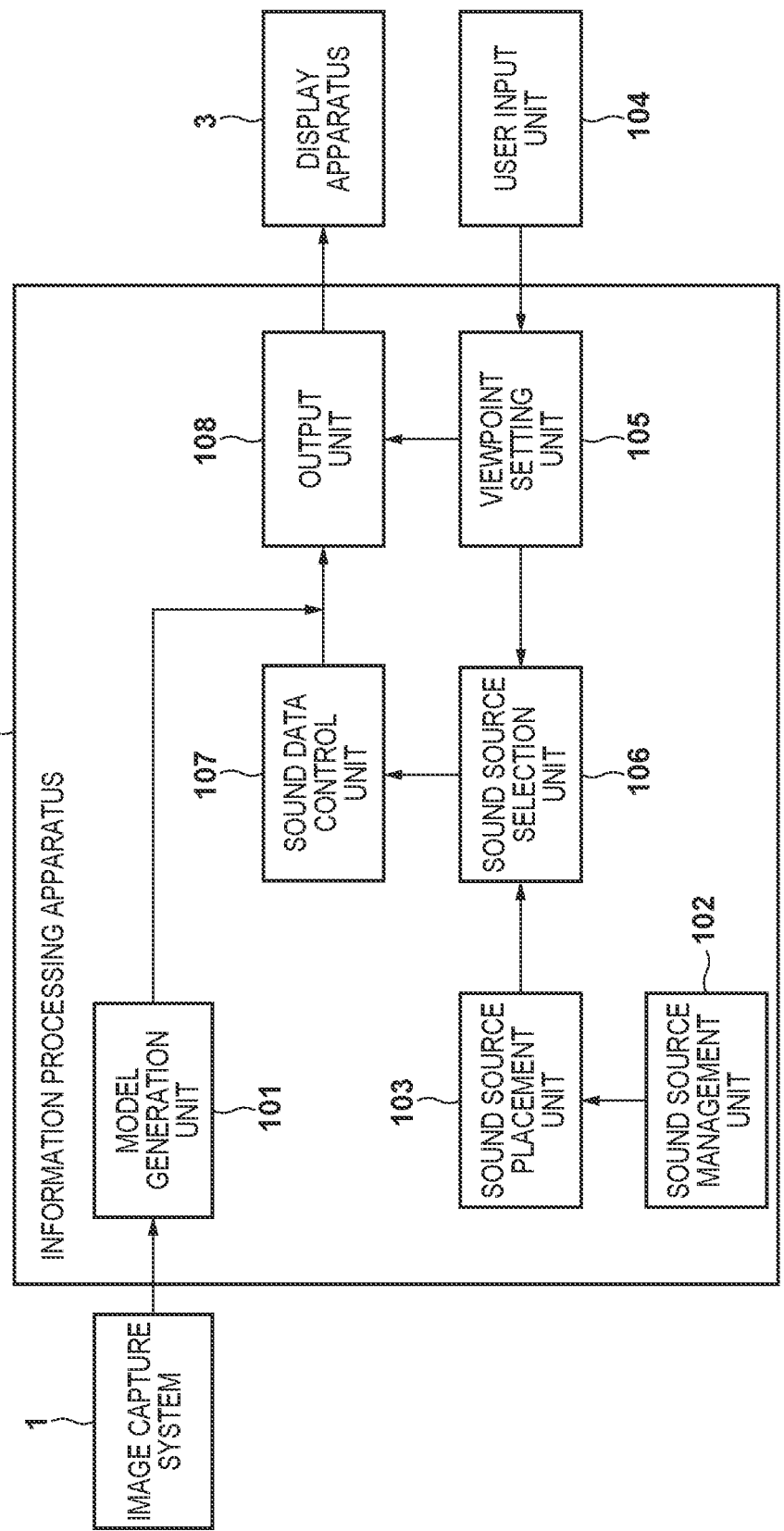
FIG. 1 is a block diagram illustrating an example of the functional configuration of an information processing apparatus according to an embodiment.

Hereinafter, embodiments will be described in detail with reference to the attached drawings. Note, the following embodiments are not intended to limit the scope of the claims. Multiple features are described in the embodiments, but limitation is not made to require all such features, and multiple such features may be combined as appropriate. Furthermore, in the attached drawings, the same reference numerals are given to the same or similar configurations, and redundant description thereof is omitted.

When generating a virtual viewpoint image seen from a virtual viewpoint, it is desirable to play back sound data such as advertisements as well.

One embodiment of the present disclosure makes it possible to play back sound data of an advertisement or the like when displaying a virtual viewpoint image seen from a virtual viewpoint.

In one embodiment, one or more virtual sound sources are placed in a three-dimensional space. The virtual sound sources may be associated with an advertisement. For example, sports video can be delivered through a virtual viewpoint image delivery service. At this time, advertisements can be delivered through the video. In such a case, a virtual advertisement can be placed at a desired position in the three-dimensional space. For example, a virtual object can be placed on a wall surface of a model such as a stadium placed in the three-dimensional space, or in a predetermined area such as a spectator seat. Furthermore, a CG image of the advertisement can be affixed to the virtual object. This makes it possible to include a virtual advertisement in the virtual viewpoint image that a viewer sees.

Furthermore, in one embodiment, sound data corresponding to each of the one or more virtual sound sources is managed. This makes it possible to play back related sound data when displaying the virtual viewpoint image. According to such embodiments, richer content can be provided in a system that displays virtual viewpoint images. In particular, in a configuration that associates sound data with a virtual advertisement, the effectiveness of the advertisement can be enhanced by outputting a combination of a visual advertisement and an audio advertisement.

First Embodiment

In one embodiment in which one or more virtual sound sources are placed in a three-dimensional space, sound data can be selected from among sound data corresponding to the respective virtual sound sources for playback. In the first embodiment, at least one virtual sound source is selected from among the one or more virtual sound sources based on information specifying a virtual viewpoint. Sound data corresponding to the selected virtual sound source is then output.

FIG. 1 is a block diagram illustrating an example of the configuration of an image processing system according to an embodiment. This image processing system includes an image capturing system 1 and an information processing apparatus 2.

The image capturing system 1 includes a plurality of image capturing apparatuses. Each of the plurality of image capturing apparatuses is disposed at a different position such that the image capturing apparatuses surround an image capturing area to be captured. The plurality of image capturing apparatuses can obtain a plurality of viewpoint images by capturing images in synchronization with each other. The image capturing system 1 may include a control unit for synchronizing the captured images. The synchronization method is not particularly limited. Note that the plurality of image capturing apparatuses need not be installed across the entire periphery of the image capturing area. For example, in light of constraints on installation locations and the like, the image capturing apparatuses may be installed only in areas located in specific directions relative to the image capturing area. The number of image capturing apparatuses is not limited. The image capturing system 1 may also include image capturing apparatuses having different functions, such as a telephoto camera and a wide-angle camera.

The image capturing system 1 may also include a sound collection unit such as a microphone or the like. The image capturing system 1 can generate sound data based on data collected by the sound collection unit. One or more, or all, of the plurality of image capturing apparatuses may include such a sound collection unit. The image capturing system 1 may also include a sound collection unit independent from the plurality of image capturing apparatuses.

The plurality of viewpoint images obtained by the image capturing system 1 are sent to a model generation unit 101 of the information processing apparatus 2. The plurality of image capturing apparatuses in the image capturing system 1 may be referred to simply as the "image capturing system 1" hereinafter.

The information processing apparatus 2 includes the model generation unit 101, a sound source management unit 102, a sound source placement unit 103, a viewpoint setting unit 105, a sound source selection unit 106, a sound data control unit 107, and an output unit 108.

The model generation unit 101 generates a 3D model of a subject from the plurality of viewpoint images received from the image capturing system 1. The model generation unit 101 also sends the generated 3D model of the subject to the output unit 108.

In one embodiment, "3D model" refers to a foreground image and a background image extracted from each of the plurality of viewpoint images. The 3D model of the subject can be constructed based on the foreground image from the plurality of viewpoint images. The foreground image and the background image can be generated through the following method, for example. First, the model generation unit 101 extracts a foreground image from a foreground area corresponding to a predetermined subject, from each of the plurality of viewpoint images. The model generation unit 101 also extracts a background image from a background area, which is an area aside from the foreground area.

The subject extracted as the foreground area may be a dynamic object exhibiting movement (i.e., the absolute position or shape thereof is variable) when images thereof are captured in time series from the same direction (i.e., a moving object). Such a subject may be a person, such as a player or a referee in a field where a game is being played. In a ball-based game, the subject may include a ball. The subject may also be a singer, actor, performer, presenter, or the like in a concert or an entertainment event.

The background area may be an object that remains stationary or nearly stationary when images thereof are captured in time series from the same direction. Such an object may be, for example, a stage at a concert or the like, or a stadium where an event such as a game is held. The object may also be a structure, such as a goal used in a ball-based game, or a field or the like. The background area is an area that is at least different from the foreground area. The plurality of viewpoint images may include other objects and the like aside from the subject corresponding to the foreground area and the object corresponding to the background area.

The sound source management unit 102 manages sound data corresponding to each of the one or more virtual sound sources. In the present embodiment, one or more virtual sound sources are placed in the three-dimensional space. The sound source management unit 102 can further manage the positions (e.g., coordinates) of each of the one or more virtual sound sources. Each virtual sound source is placed in the same three-dimensional space as the virtual viewpoint (described later). The coordinates of the virtual sound source can then indicate the same coordinates in the three-dimensional space as virtual viewpoint video. In this manner, the sound source management unit 102 can manage sound data associated with the position of each virtual sound source. In one embodiment, the position of the virtual sound source is set as a generation position for the sound data corresponding to the virtual sound source.

The sound source management unit 102 can furthermore manage a model placed at each position of one or more virtual sound sources. A model placed at the position of a specific virtual sound source may simply be referred to as a "virtual sound source" hereinafter. The type of the model is not particularly limited, and may be a 2D object or a 3D object. The object may be an object to which CG texture data is applied. The model may also be an avatar to which material information has been added. In one embodiment, at least one of the one or more virtual sound sources is associated with a model of an advertisement placed in the three-dimensional space. In other words, an object which is an advertisement is placed at the position of the virtual sound source. On the other hand, at least one of the one or more virtual sound sources need not be associated with a model placed in the three-dimensional space. In other words, the object need not be placed at the position of the virtual sound source. Additionally, the position of the virtual sound source may be determined in advance regardless of the position of the subject or the 3D model thereof.

FIG. 2 illustrates an example of a data structure indicating the data corresponding to each of the virtual sound sources. An index number (also indicated as "pattern No.") is assigned to each virtual sound source placed in the three-dimensional space. The pattern No. is assigned in accordance with the number of patterns of virtual sound sources to be displayed in the virtual viewpoint image. This data structure also includes position information ("Position") and orientation information of each virtual sound source. The orientation information includes the rotation ("Rotation") and scale ("Scale") of the object. This data structure also includes information indicating the object placed at the position of each virtual sound source ("OBJECT"). This data structure further includes appearance information of the object ("CG/MATERIAL"), such as CG texture data or material information added to the object, for each virtual sound source. This data structure further stores the sound data associated with each virtual sound source. The object setting information, such as the orientation information, material information, texture data, and the like of the object, will be collectively referred to as "object information" hereinafter. Information such as the volume, length, sampling rate, or the like of the sound data can also be stored along with the sound data.

The sound source placement unit 103 places the virtual sound source in the three-dimensional space. Specifically, the sound source placement unit 103 places the model corresponding to the virtual sound source at each position of the one or more virtual sound sources. To be more specific, the sound source placement unit 103 first loads the position information and orientation information of the virtual sound source, the object information, the appearance information of the object, and the sound data, which are managed by the sound source management unit 102. After these items are loaded, the sound source placement unit 103 places the object to which the object appearance information is applied and the sound data in the same three-dimensional space as the virtual viewpoint video. The sound source placement unit 103 sends this placement information to the sound source selection unit 106 and the output unit 108.

The viewpoint setting unit 105 obtains information specifying a virtual viewpoint in the three-dimensional space. The viewpoint setting unit 105 can obtain this information from a user input unit 104, for example. The user input unit 104 is an input device connected to the information processing apparatus 2 directly or over a network. The input device can be a typical device used by a user to make input operations, such as a controller, a keyboard, or a mouse. The input device may also be a tracking controller such as a head-mounted display (HMD).

The user can input information indicating the position and orientation of the virtual viewpoint (also called a "virtual camera") through the user input unit 104. Specifically, the user can input a parameter set including parameters expressing the position of the virtual camera in the three-dimensional space and parameters expressing the orientation of the virtual camera in the pan, tilt, and roll directions. However, the content of the information input by the user is not limited thereto. For example, the parameter set may include parameters expressing the size of the field of view (angle of view) of the virtual camera. Note that a "virtual camera" is a virtually-implemented camera different from the plurality of image capturing apparatuses that are actually installed around the image capturing area. "Virtual camera" is a concept used to describe the virtual viewpoint used when generating virtual viewpoint video.

The viewpoint setting unit 105 sets a virtual viewpoint based on the parameter set for the virtual viewpoint received from the user input unit 104. In other words, the viewpoint setting unit 105 can place a virtual viewpoint which has the orientation indicated in the parameter set at the position indicated in the parameter set. The viewpoint setting unit 105 then sends the placement information of the set virtual viewpoint to the sound source selection unit 106 and the output unit 108.

The sound source selection unit 106 selects at least one virtual sound source from among the one or more virtual sound sources. The sound source selection unit 106 can select the at least one virtual sound source based on the information specifying the virtual viewpoint. In the present embodiment, the sound data is played back from the virtual sound source selected by the sound source selection unit 106. In the present embodiment, the sound source selection unit 106 selects the virtual sound source based on at least one of the position and orientation of the virtual viewpoint. The virtual viewpoint image changes according to the virtual viewpoint, and thus such a configuration makes it possible to output sound data which matches the virtual viewpoint image.

Specifically, the sound source selection unit 106 receives the object placed at the position of the virtual sound source and the placement information of the sound data from the sound source placement unit 103. The sound source selection unit 106 also receives the placement information of the virtual viewpoint from the viewpoint setting unit 105. The sound source selection unit 106 then selects the virtual sound source based on the received information. The sound source selection unit 106 sends selection information indicating the selected virtual sound source to the sound data control unit 107.

In one embodiment, the sound data corresponding to a virtual sound source included in the field of view of a virtual viewpoint selected from the one or more virtual sound sources is output. To that end, the sound source selection unit 106 can select at least one virtual sound source present in the field of view of the virtual viewpoint. According to such a configuration, sound data associated with the generated virtual viewpoint image can be played back, which improves the user experience.

In one embodiment, sound data corresponding to a virtual sound source selected based on at least one of the position of a virtual viewpoint and a line-of-sight direction of the virtual viewpoint is output from the one or more virtual sound sources. For example, the sound source selection unit 106 may select the virtual viewpoint based on the relationship between the line-of-sight direction of the virtual viewpoint and the direction from the virtual viewpoint toward the virtual sound source. In one example, the direction from the virtual viewpoint toward the selected one virtual sound source is closer to the line-of-sight direction of the virtual viewpoint than the direction from the virtual viewpoint toward a virtual sound source, among the plurality of virtual sound sources, that is different from the selected one virtual sound source. Note that the two directions being "closer" means that the angle formed by the two directions (set to be 180° or less) is closer. According to such a configuration, sound data associated with an area near the center of the generated virtual viewpoint image, i.e., an area of interest to the user, can be played back, which improves the user experience.

Additionally, the sound source selection unit 106 may select the virtual viewpoint based on a positional relationship between the virtual viewpoint and the virtual sound source. In one example, the distance from the virtual viewpoint to the selected one virtual sound source is shorter than a distance from the virtual viewpoint to a virtual sound source, among the plurality of virtual sound sources, that is different from the selected one virtual sound source. According to such a configuration, sound data associated with the position of the virtual viewpoint can be played back, which improves the user experience.

The sound source selection unit 106 may further switch the method for selecting the plurality of virtual sound sources. For example, the sound source selection unit 106 may switch the method for selecting at least one virtual sound source from among the one or more virtual sound sources according to whether the position of the virtual viewpoint is within a predetermined area. Such a configuration makes it easier to select the virtual sound source according to the virtual viewpoint, particularly when the distribution of virtual sound sources within the predetermined area and outside the predetermined area are different. For example, such a configuration can be used when a virtual sound sources are placed around the predetermined area. A specific method for selecting the virtual sound source will be described later with reference to the flowchart in FIG. 4.

The sound data control unit 107 outputs management information for controlling the playback of the sound data to the output unit 108. In the present embodiment, the sound data control unit 107 manages the playback and stopping of the sound data when the virtual viewpoint image is displayed according to the selection information received from the sound source selection unit 106. For example, during the playback of the sound data corresponding to one virtual sound source, the selection information of the virtual sound source received from the sound source selection unit 106 may change and indicate another virtual sound source. In this case, the sound data control unit 107 can switch the output sound data from sound data corresponding to a first virtual sound source among the plurality of virtual sound sources to sound data corresponding to a second virtual sound source among the plurality of virtual sound sources. In other words, the sound data control unit 107 can send the management information to the output unit 108 so as to switch the virtual sound source and the sound data corresponding thereto. Alternatively, the sound data control unit 107 may control the volume of the output sound data when switching the sound data. For example, when switching the sound data, the sound data control unit 107 may control the playback of the sound data so as to add a sound effect, such as fading out, to sound data that is to be terminated. Alternatively, the sound data control unit 107 may control the playback of the sound data so as to add a sound effect, such as fading, to the newly played sound data.

The sound data control unit 107 may control the sound data output based on the placement information of the virtual sound source and the placement information of the virtual viewpoint. For example, the sound data control unit 107 may control the volume of the sound data based on the distance between the virtual sound source and the virtual viewpoint. The sound data control unit 107 may also control the output of the sound data such that the sound data can be heard from the direction of the virtual sound source. However, it is not necessary for the sound data control unit 107 to perform such control. For example, the volume of sound data corresponding to the virtual sound source selected by the sound source selection unit 106 need not change according to the positional relationship between the virtual sound source and the virtual viewpoint.

The output unit 108 outputs the virtual viewpoint image and the sound data corresponding to at least one virtual sound source among the one or more virtual sound sources. This sound data is data that can be played back along with the virtual viewpoint image. The output unit 108 can output virtual viewpoint video including virtual viewpoint images and sound data in time series. Here, the output unit 108 can output sound data corresponding to at least one virtual sound source selected by the sound source selection unit 106. The output unit 108 can output the obtained virtual viewpoint image to a display apparatus 3. The display apparatus 3 is a user terminal, for example. The display apparatus can display the received virtual viewpoint image. The output unit 108 can also output the sound data to the display apparatus 3 or another apparatus.

Specifically, the output unit 108 receives the information from the model generation unit 101, the sound source placement unit 103, the sound data control unit 107, and the viewpoint setting unit 105. The output unit 108 then renders the virtual viewpoint image based on the 3D model and virtual viewpoint placement information received. The output unit 108 can also output sound data corresponding to the virtual sound source selected by the sound source selection unit 106. Specifically, the output unit 108 can output sound data according to the placement information of the virtual sound source and the management information of the sound data.

The output unit 108 can generate the virtual viewpoint image through the following method, for example. A virtual sound source is placed in the three-dimensional space as described above. In addition, a 3D model of a subject in a real space is placed in the three-dimensional space. The 3D model of the subject can be generated based on captured images of the subject captured by the plurality of image capturing apparatuses. Such captured images can be obtained using the image capturing system 1 described above. A background model may also be placed in the three-dimensional space. The output unit 108 can render a virtual viewpoint image from the virtual viewpoint placed in such a three-dimensional space using ray tracing or the like.

Specifically, the output unit 108 generates a foreground model expressing the three-dimensional shape of the predetermined subject based on the foreground image. The method for generating the foreground model is not particularly limited, and the volume intersection method can be given as one example thereof. The output unit 108 also generates texture data used to color the foreground model based on the foreground image. Furthermore, the output unit 108 generates texture data used to color the background model expressing the three-dimensional shape of the background, such as a stadium or the like, based on the background image. The output unit 108 then colors the foreground model and the background model by mapping the texture data thereto. The output unit 108 then generates a virtual viewpoint image by rendering the virtual viewpoint according to the virtual viewpoint indicated by the virtual viewpoint placement information. However, the method for generating the virtual viewpoint image is not limited to such a method. For example, the output unit 108 may generate the virtual viewpoint image by projection conversion of the captured images, without using a three-dimensional model.

Figure 3:
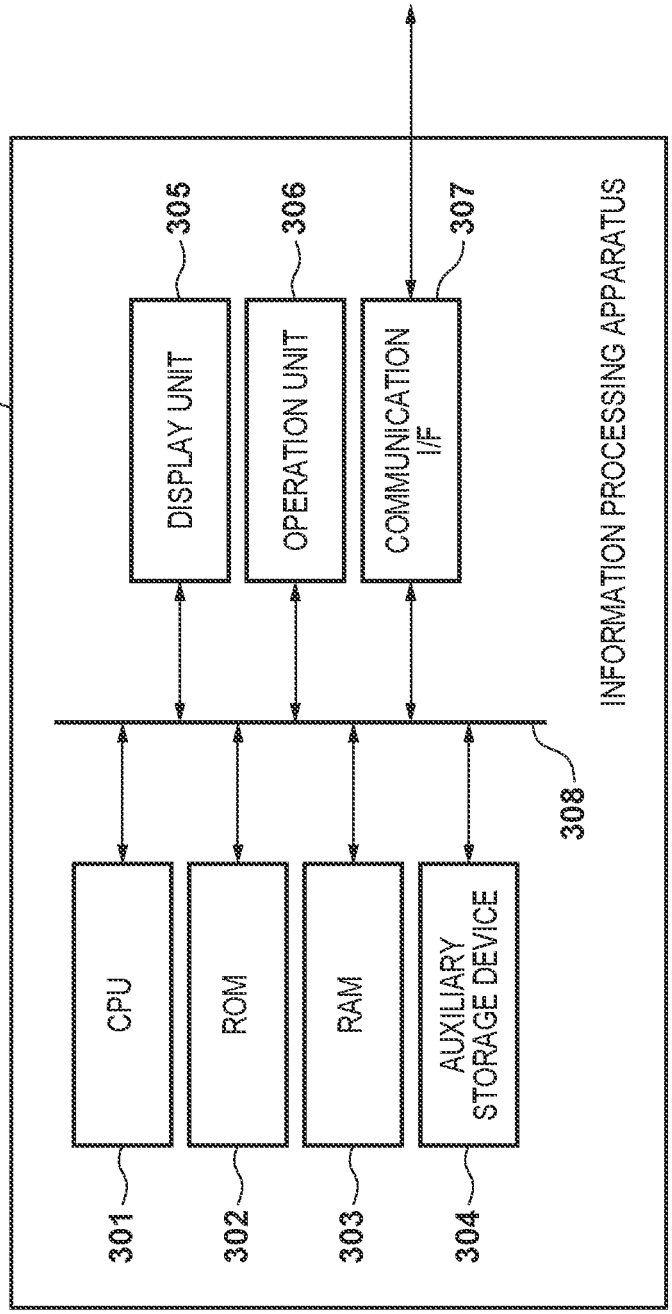
FIG. 3 is a block diagram illustrating an example of the hardware configuration of an information processing apparatus according to an embodiment.

FIG. 3 is a block diagram illustrating an example of the hardware configuration of the information processing apparatus 2. The information processing apparatus 2 includes a CPU 301, a ROM 302, a RAM 303, an auxiliary storage device 304, a display unit 305, an operation unit 306, a communication I/F 307, and a bus 308.

The CPU 301 implements the functions of the information processing apparatus 2 illustrated in FIG. 2 by controlling the information processing apparatus 2 as a whole using computer programs or data stored in the ROM 302 or the RAM 303. Note that the information processing apparatus 2 may include one or more pieces of dedicated hardware different from the CPU 301. In this case, at least some of the processing performed by the CPU 301 can be executed by the dedicated hardware. An application-specific integrated circuit (ASIC), a field-programmable gate array (FPGA), a digital signal processor (DSP), and the like can be given as examples of such dedicated hardware.

The ROM 302 is a non-volatile memory. The ROM 302 can store programs and the like that do not need to be changed. The RAM 303 is a primary storage memory. The RAM 303 can temporarily store programs or data supplied from the auxiliary storage device 304, data supplied from the exterior via the communication I/F 307, or the like. The auxiliary storage device 304 is a hard disk drive, for example. The auxiliary storage device 304 can store various types of data, such as image data or sound data.

The display unit 305 can display text or images. The display unit 305 is a liquid crystal or LED display, for example. The display unit 305 can display a graphical user interface (GUI) that the user uses to operate the information processing apparatus 2. The operation unit 306 can accept user operations and input instructions based on the user operations to the CPU 301. The operation unit 306 can be a keyboard, a mouse, a joystick, or a touch panel, for example. The CPU 301 can also function as a display control unit that controls the display unit 305 and an operation control unit that controls the operation unit 306. FIG. 3 depicts the display unit 305 and the operation unit 306 as being present within the information processing apparatus 2. However, at least one of the display unit 305 and the operation unit 306 may be a separate apparatus external to the information processing apparatus 2.

The communication I/F 307 is used for the information processing apparatus 2 to communicate with external apparatuses. For example, if the information processing apparatus 2 is connected to external apparatuses over wires, a communication cable is connected to the communication I/F 307. If the information processing apparatus 2 has a function for communicating wirelessly with external apparatuses, the communication I/F 307 includes an antenna. The bus 308 connects the various units of the information processing apparatus 2 to each other and transmits information.

Figure 4:
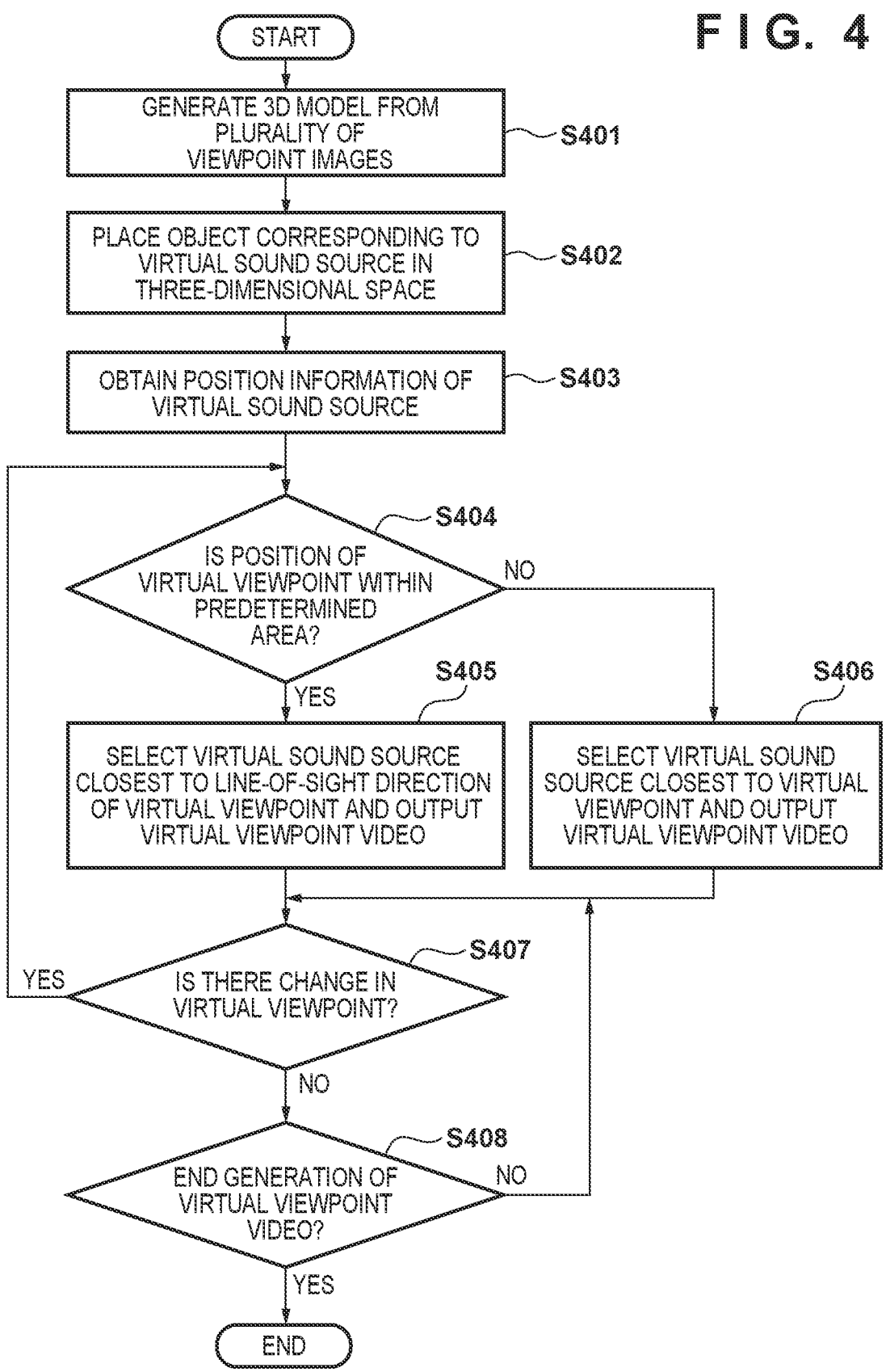
FIG. 4 is a flowchart illustrating an information processing method according to an embodiment.

An information processing method according to one embodiment will be described hereinafter with reference to the flowchart in FIG. 4. In the processing described below, the information processing apparatus 2 selects a virtual sound source to play back sound data, from among virtual sound sources in the same three-dimensional space as virtual viewpoint video. The information processing apparatus 2 then renders the virtual viewpoint video. In the following processing, virtual viewpoint video is obtained that includes time-series virtual viewpoint images of a subject based on a plurality of viewpoint images of the subject at a single point in time and a virtual viewpoint having a position and orientation that change over time. In this manner, the information processing apparatus 2 can generate virtual viewpoint video of a subject at rest from a virtual viewpoint that moves. However, the information processing apparatus 2 may generate virtual viewpoint video of a moving subject from a virtual viewpoint that is at rest. The information processing apparatus 2 may also generate virtual viewpoint video of a moving subject from a virtual viewpoint that moves. In these cases, in step S401 (described later), the model generation unit 101 can generate the 3D model of the subject at each point in time based on the plurality of viewpoint images of the subject in time series. Using a 3D model of the subject at each point in time in this manner makes it possible for the output unit 108 to generate virtual viewpoint video of a moving subject.

Note that it is not necessary for the time at which the image of the subject is captured and the sound data to be synchronized. For example, the sound data may be played back with the virtual viewpoint video for a subject at a specific point in time based on a virtual viewpoint having a position and orientation that change over time. The sound data may also be played back with a virtual viewpoint image of the subject at a specific point in time based on a specific virtual viewpoint (i.e., with a still image).

In the following example, the sound source selection unit 106 selects only one virtual sound source from among the plurality of virtual sound sources. The output unit 108 then outputs sound data corresponding to the selected one virtual sound source. However, the sound source selection unit 106 may select two or more virtual sound sources. In this case, the output unit 108 can output sound data corresponding to the selected two or more virtual sound sources as sound data to be played back simultaneously. The sound data control unit 107 can also control the volume of the sound data corresponding to the two or more virtual sound sources. For example, the sound data control unit 107 may control the volume of sound data corresponding to a virtual sound source based on the relationship between a line-of-sight direction of the virtual viewpoint and the direction from the virtual viewpoint toward the virtual sound source, or based on the positional relationship between the virtual viewpoint and the virtual sound source. In another embodiment, the sound data control unit 107 may control the playback of the sound data such that the sound data corresponding to the virtual sound source selected by the sound source selection unit 106 is played back at a higher volume than the sound data corresponding to a virtual sound source not selected by the sound source selection unit 106.

Furthermore, the sound source selection unit 106 may be capable of switching the virtual sound source in response to a user selection. In this case, the output unit 108 can output sound data corresponding to at least one virtual sound source selected by the user from among the one or more virtual sound sources. For example, after the sound source selection unit 106 selects the virtual sound source through the method described above, the sound source selection unit 106 may change the virtual sound source that plays back the sound data to a virtual sound source selected by the user.

In step S401, the image capturing system 1 sends a plurality of viewpoint images to the model generation unit 101 of the information processing apparatus 2. The model generation unit 101 generates a 3D model based on the received plurality of viewpoint images. The model generation unit 101 then sends the 3D model to the output unit 108.

In step S402, the sound source management unit 102 sends the stored information indicating an object corresponding to the position information of each virtual sound source, the appearance information of the object, and the sound data, to the sound source placement unit 103. The sound source placement unit 103 places the object and sound data corresponding to the virtual sound source received from the sound source management unit 102 in the same three-dimensional space as the virtual viewpoint video.

In step S403, the sound source placement unit 103 sends the position information and sound data of each virtual sound source placed in step S402 to the output unit 108 via the sound source selection unit 106 and the sound data control unit 107.

In step S404, the viewpoint setting unit 105 receives the parameter set of the virtual viewpoint from the user input unit 104. The viewpoint setting unit 105 also sets the position and orientation of the virtual viewpoint based on the parameter set of the virtual viewpoint. The viewpoint setting unit 105 then sends the information indicating the position and orientation of the virtual viewpoint to the sound source selection unit 106 and the output unit 108.

Here, the viewpoint setting unit 105 determines whether the position of the virtual viewpoint is in a predetermined area. The predetermined area is the image capturing area, for example. The image capturing area is an area where the foreground model is placed in the three-dimensional space. The information processing apparatus 2 is capable of generating a foreground model of a subject in a predetermined area of a real space based on the captured images captured by the image capturing system 1, and the image capturing area is an area corresponding to that predetermined area. The image capturing area may be set in advance. For example, the image capturing area may be set using parameters based on coordinates or the like set during image capture. On the other hand, the image capturing area may be specified separately.

If the viewpoint setting unit 105 determines that the position of the virtual viewpoint is within the image capturing area, the processing of step S405 is executed. If not, the processing of step S406 is executed. In this manner, the virtual sound source is selected through different methods depending on whether the position of the virtual viewpoint is within the image capturing area.

In step S405, the output unit 108 outputs the virtual viewpoint video. As described above, the output unit 108 can generate virtual viewpoint video through rendering based on the 3D model, the placement information of the virtual sound source, the management information of the sound data, and the placement information of the virtual viewpoint. Here, the output unit 108 outputs sound data corresponding to at least one virtual sound source selected from the one or more virtual sound sources.

In step S405, the sound source selection unit 106 selects at least one virtual sound source included in the virtual viewpoint image. Specifically, the sound source selection unit 106 can determine the line-of-sight direction of the virtual viewpoint and the field angle of the virtual viewpoint based on the placement information received from the viewpoint setting unit 105. Based on the line-of-sight direction and field angle of the virtual viewpoint, the sound source selection unit 106 can select a virtual sound source included in the field of view of the virtual viewpoint from among the virtual sound sources placed in the three-dimensional space. The sound source selection unit 106 may select the virtual sound source such that the model placed at the position of the virtual sound source is at least partially included in the field of view of the virtual viewpoint. The sound source selection unit 106 then sends the selection information indicating the selected virtual sound source to the sound data control unit 107. The sound data control unit 107 sends the management information to the output unit 108 such that the sound data corresponding to the virtual sound source selected by the sound source selection unit 106 is played back according to the received selection information.

Figure 5:
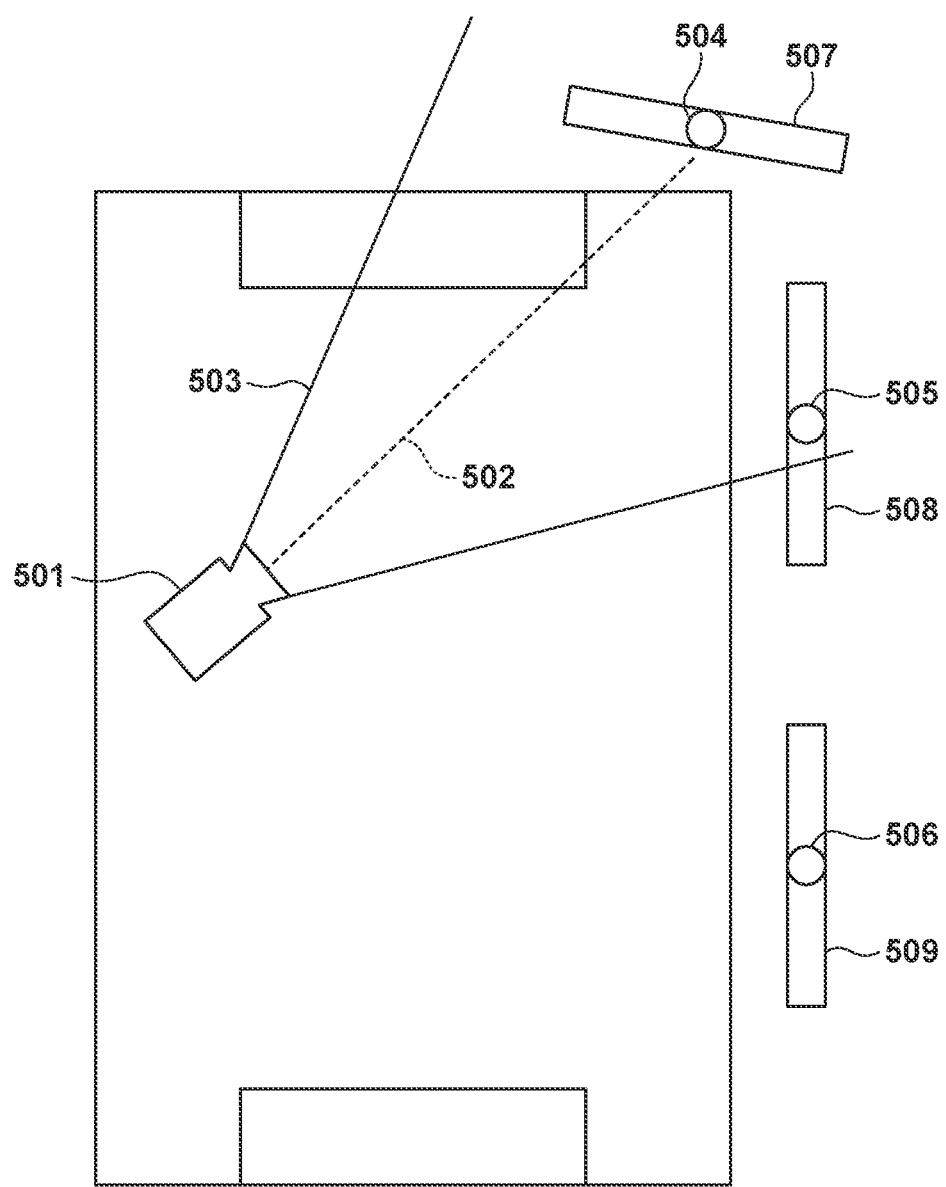
FIG. 5 is a diagram illustrating a method for selecting a virtual sound source based on a line-of-sight direction of a virtual viewpoint.

The sound source selection unit 106 also selects the virtual viewpoint based on the relationship between the line-of-sight direction of the virtual viewpoint and the direction from the virtual viewpoint toward the virtual sound source. FIG. 5 is a diagram illustrating such a method for selecting a virtual sound source. Although the virtual viewpoint and the virtual sound source are arranged in a three-dimensional space, two-dimensional diagrams will be used for the descriptions provided hereinafter. FIG. 5 illustrates the position and orientation of a virtual viewpoint 501 based on input made through the user input unit 104. A line-of-sight direction 502 of the virtual viewpoint 501 corresponds to a forward direction of the virtual viewpoint. A field of view area 503 corresponds to the field angle of the virtual viewpoint 501. The generated virtual viewpoint image is an image within the field of view area 503. Virtual sound sources 504, 505, and 506 are placed at corresponding positions by the sound source placement unit 103. Virtual advertisements 507, 508, and 509 are models corresponding to the virtual sound sources 504, 505, and 506 and placed at the positions of the virtual sound sources 504, 505, and 506, respectively.

The sound source selection unit 106 can select a virtual sound source close to the line-of-sight direction 502 of the virtual viewpoint 501. For example, the angle formed by a line from the virtual viewpoint toward the selected virtual sound source and the line-of-sight direction of the virtual viewpoint is smaller than the angle formed by the line from the virtual viewpoint toward another virtual sound source and the line-of-sight of the virtual viewpoint. The sound source selection unit 106 may determine the model appearing at the position closest to the center of the field of view of the virtual viewpoint 501 in the virtual viewpoint image, and select the virtual sound source corresponding to the model.

In the example in FIG. 5, the sound source selection unit 106 first determines the virtual advertisements which are present in the field of view area 503, i.e., the virtual advertisements 507 and 508. The sound source selection unit 106 then determines the virtual sound sources corresponding to the determined virtual advertisements 507 and 508, i.e., the virtual sound sources 504 and 505. Furthermore, the sound source selection 106 selects the virtual sound source 504, which is closest to the line-of-sight direction 502 of the virtual viewpoint, from among the virtual sound sources 504 and 505.

In step S406, the output unit 108 outputs the virtual viewpoint video. The processing of step S406 can be performed in the same manner as step S405, aside from the method for selecting the virtual sound source. In step S406, the sound source selection unit 106 selects the virtual sound source closest to the position of the virtual viewpoint. For example, the sound source selection unit 106 can select the virtual sound source closest to the position of the virtual viewpoint based on the position information of the virtual viewpoint received from the viewpoint setting unit 105.

Figure 6:
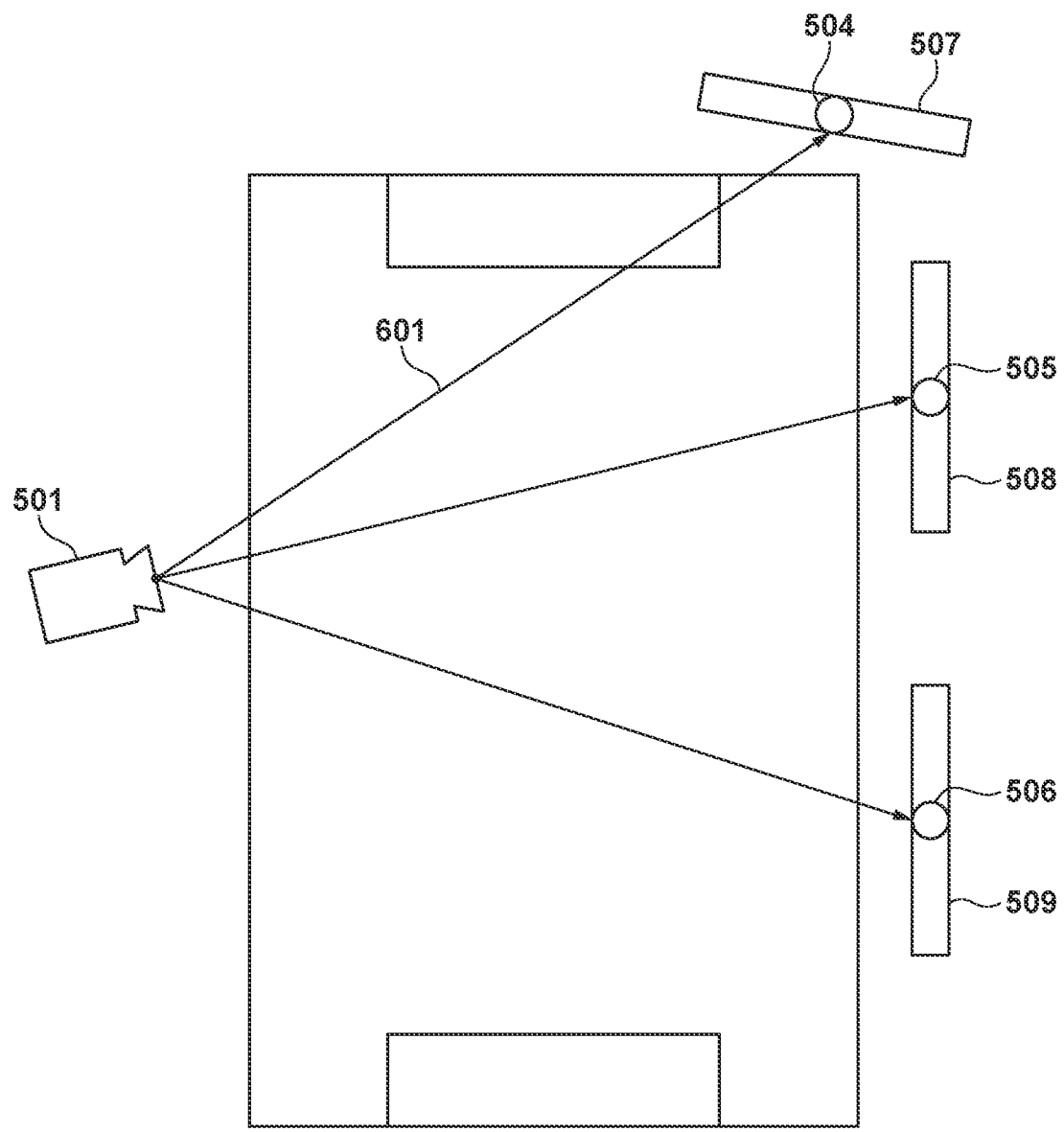
FIG. 6 is a diagram illustrating a method for selecting a virtual sound source based on a distance from a virtual viewpoint.

FIG. 6 is a diagram illustrating a method for selecting a virtual sound source close to a virtual viewpoint. Like FIG. 5, FIG. 6 illustrates the virtual viewpoint 501, the virtual sound sources 504 to 506, and the virtual advertisements 507 to 509. The sound source selection unit 106 determines a distance from the virtual viewpoint 501 to each of the virtual sound sources 504 to 506. For example, in FIG. 6, a distance 601 is the shortest distance between the virtual viewpoint 501 and the virtual sound source 504. Based on the determined distances, the sound source selection unit 106 can select the virtual sound source 505, which is closest to the virtual viewpoint 501, from among the virtual sound sources 504 to 506.

In step S407, the sound source selection unit 106 determines whether the placement information of the virtual viewpoint received from the viewpoint setting unit 105 has changed. If the sound source selection unit 106 determines that the placement information of the virtual viewpoint has changed, the processing of step S404 and on is executed. In this case, the sound source selection unit 106 can reselect the virtual sound source. The output unit 108 can also output the virtual viewpoint video based on the new virtual viewpoint.

In step S408, the output unit 108 determines whether to end the generation of the virtual viewpoint video. For example, if the playback or delivery of the virtual viewpoint video is to end, the output unit 108 determines to end the generation of the virtual viewpoint video. If the output unit 108 has determined that the generation of the virtual viewpoint video is to end, the processing according to FIG. 4 ends. If not, the processing of step S407 is executed.

As described above, according to the present embodiment, sound data to be played back with a virtual viewpoint image can be selected, which makes it possible to improve the user experience. In particular, in one embodiment, one or more models (e.g., advertisement models) are placed in a three-dimensional space. Sound data corresponding to a model, among the one or more models, that appears in the virtual viewpoint image is then output. According to such a configuration, sound data (e.g., advertisement audio) corresponding to a model that appears in a virtual viewpoint image (e.g., an advertisement model) can be played back. The user experience can therefore be improved, and in particular, the advertising effectiveness of the virtual advertisement can be enhanced.

Second Embodiment

As described above, the information processing apparatus 2 can output a virtual viewpoint image seen from a virtual viewpoint in a three-dimensional space in which a 3D model, which is based on a plurality of captured images of a subject in a real space, is placed. In the present embodiment, sound data, such as an audio advertisement, is output so as to be played back along with the virtual viewpoint image. Here, the volume of the sound data is adjusted according to the volume of collected sound data collected when the plurality of captured images are captured. In this manner, the collected sound data collected when the images are captured is used as environment sound from when the images are captured. The volume of the sound data is then controlled according to the volume of the environment sound.

An image processing system according to the present embodiment will be described with reference to FIG. 1. The model generation unit 101, the sound source management unit 102, the sound source placement unit 103, the viewpoint setting unit 105, the sound source selection unit 106, and the output unit 108 have the same configurations as in the first embodiment.

In the present embodiment, the sound data control unit 107 obtains collected sound data collected when a plurality of captured images are captured in a real space. The image capturing system 1 can obtain the collected sound data synchronized with the captured images. The synchronization method is not particularly limited. The image capturing system 1 can send the collected sound data to the sound data control unit 107.

The sound data control unit 107 stores the collected sound data received from the image capturing system 1. The sound data control unit 107 can also calculate, from the collected sound data that is stored, the volume of the image capturing environment (e.g., a noise level) for each point in time the sound is collected, and then save the calculated noise level. If the image capturing system 1 includes a plurality of sound collection units, the sound data control unit 107 may calculate the noise level based on data obtained by averaging the collected sound data obtained by the sound collection units. On the other hand, the sound data control unit 107 may calculate the noise level based on the collected sound data obtained by the sound collection units, and then calculate the average value of the power of the noise level for each instance of the collected sound data. Depending on the image capturing environment, it is also conceivable not to use the collected sound data collected by some of the sound collection units or image capturing apparatuses in the calculation of the noise level. The noise level saved at each point in time is associated with corresponding points in time in the virtual viewpoint video as environment sound information.

Furthermore, the sound data control unit 107 adjusts the volume of the sound data according to the volume of the collected sound data. For example, the sound data control unit 107 can reduce the volume of the sound data when the volume of the collected sound data is low. For example, the sound data control unit 107 can control the volume of sound data corresponding to at least one virtual sound source so as not to exceed the volume of collected sound data collected when the captured images are captured. In this manner, the sound data control unit 107 may limit the volume of the sound data so as not to exceed the volume of the collected sound data. For example, the volume of the sound data can be reduced such that the volume of the sound data becomes about the same as the volume of the collected sound data. On the other hand, the sound data control unit 107 may increase the volume of the sound data when the volume of the collected sound data is high. For example, the volume of the sound data can be increased such that the volume of the sound data becomes about the same as the volume of the collected sound data.

The sound data control unit 107 may adjust the volume of sound data for each point in time according to the noise level in the collected sound data calculated at each point in time. If the output unit 108 generates virtual viewpoint video for a subject at a specific point in time, the sound data control unit 107 can obtain the noise level of the collected sound data at that point in time. The sound data control unit 107 can also calculate the noise level for the sound data to be played back. The sound data control unit 107 can then control the volume of the sound data based on a comparison between the noise level for the sound data to be played back and the noise level in the collected sound data. The sound data control unit 107 can output management information indicating such volume control to the output unit 108. Note that the sound data control unit 107 can compare the volume of the sound data with the noise level of the collected sound data for each frame in the virtual viewpoint video. On the other hand, the timing of the comparison does not necessarily have to be synchronized with the frames of the virtual viewpoint video. For example, a period may be set for the timing of periodical comparison.

In the present embodiment, the sound data to be output may be determined in advance. In this case, the sound source management unit 102, the sound source placement unit 103, and the sound source selection unit 106 are unnecessary. On the other hand, as in the first embodiment, sound data corresponding to at least one virtual sound source among the one or more virtual sound sources may be output. In this case, the sound data control unit 107 can control the volume of sound data corresponding to the virtual sound source selected by the sound source selection unit 106. In such an embodiment, the sound data control unit 107 controls the playback and stopping of the sound data played back from the virtual sound source when the virtual viewpoint video is displayed, based on the placement information of the virtual sound source received from the sound source selection unit 106. The sound data control unit 107 furthermore controls the volume of the virtual sound source according to the time information.

In the present embodiment, the output unit 108 may output the collected sound data in addition to the sound data.

An information processing method according to the present embodiment will be described hereinafter with reference to the flowchart in FIGS. 7A-7B. Of the processing illustrated in FIGS. 7A-7B, steps S401 to S408 are the same as in FIG. 4 and will therefore not be described.

In step S701, the sound data control unit 107 receives the collected sound data obtained by the image capturing system 1. Based on the collected sound data obtained, the sound data control unit 107 calculates the volume (e.g., the noise level) of the environment sound for each point in time at which sound is collected, as described above. The calculated noise level is then saved as the environment sound information associated with a point in time in the virtual viewpoint video.

In step S702, the sound data control unit 107 calculates the volume (e.g., the noise level) of the sound data to be played back from the virtual sound source selected in step S405 or step S406. The noise level of the sound data may be calculated in advance. For example, when storing the sound data in the sound source management unit 102, the noise level may be calculated and saved as a parameter in the sound source management unit 102. The sound data control unit 107 then obtains the volume (e.g., the noise level) of the environment sound at the playback time corresponding to the virtual viewpoint video generated in step S405 or step S406. The sound data control unit 107 then determines whether the volume of the sound data is lower than the volume of the environment sound. If the sound data control unit 107 determines that the volume of the sound data is lower than the volume of the environment sound, the processing of step S703 is performed. If not, the processing of step S704 is performed.

In step S703, the sound data control unit 107 adjusts the volume of the sound data such that the volume of the sound data played back from the virtual sound source is the same as the volume of the environment sound. For example, the sound data control unit 107 can increase the volume of the sound data. The sound data control unit 107 also sends the management information indicating the adjusted volume to the output unit 108.

In step S704, the sound data control unit 107 adjusts the volume of the sound data such that the noise level of the sound data played back from the virtual sound source does not exceed the noise level of the environment sound. For example, the sound data control unit 107 can reduce the volume of the sound data. The sound data control unit 107 also sends the management information indicating the adjusted volume to the output unit 108.

Note that the method for adjusting the volume of the sound data played back from the virtual sound source is not limited. For example, the sound data control unit 107 can increase or reduce the overall volume of the sound data. On the other hand, the sound data control unit 107 may increase or reduce the volume of only part of the sound data being played back. The sound data control unit 107 may also control the volume of the sound data corresponding to at least one virtual sound source according to the distance between the virtual viewpoint and the at least one virtual sound source. For example, in steps S703 and S704, the sound data control unit 107 may take into account attenuation of sound based on distance, and further adjust the volume of the sound data played back from the virtual sound source in accordance with the distance between the virtual sound source and the virtual viewpoint.

As described above, according to the present embodiment, the volume of sound data can be controlled when playing back the sound data. Accordingly, the sound data can be played back without interfering with the user experience. For example, when displaying a virtual viewpoint image of a sport, the volume of sound data such as advertisements can be reduced in scenes where spectators are concentrating and there is little noise. This allows the user to stay focused. On the other hand, when there is more noise, the volume can be increased such that the sound data can be heard more easily. In such cases, increasing the volume of the sound data will not interfere with the user experience.

Other Embodiments

The information processing apparatus 2 need not include all the processing units illustrated in FIG. 2. For example, an information processing apparatus according to one embodiment may obtain the 3D model of the subject from another apparatus. An information processing apparatus according to one embodiment is a server that delivers virtual viewpoint images and sound data. Such an information processing apparatus can output virtual viewpoint images and sound data to a client apparatus according to information specifying a virtual viewpoint received over a network. An information processing apparatus according to one embodiment is a user terminal that generates and plays back virtual viewpoint images and sound data. Such an information processing apparatus may obtain data corresponding to the virtual sound source such as that illustrated in FIG. 2 from another apparatus. Additionally, an information processing apparatus according to one embodiment may be constituted by a plurality of information processing apparatuses connected over a network, for example. For example, an information processing apparatus according to one embodiment may be constituted by a plurality of servers. An information processing apparatus according to one embodiment may also be constituted by a combination of a server and a client.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-004704, filed Jan. 16, 2023, which is hereby incorporated by reference herein in its entirety.

What is claimed is:

1. An information processing apparatus comprising one or more memories storing instructions and one or more processors that execute the instructions to:
   obtain information specifying a virtual viewpoint in a three-dimensional space in which one or more models and one or more virtual sound sources are placed;
   manage sound data corresponding to each of the one or more virtual sound sources;
   generate a virtual viewpoint image of the three-dimensional space based on the virtual viewpoint; and
   output the virtual viewpoint image and the sound data corresponding to a model, among the one or more models, that appears in the virtual viewpoint image and at least one virtual sound source among the one or more virtual sound sources, wherein:
   a 3D model based on captured images of a subject captured by a plurality of image capturing apparatuses in a real space is further placed in the three-dimensional space, and
   the one or more processors execute the instructions to adjust a volume of the sound data corresponding to the at least one virtual sound source based on a volume of collected sound data collected when the captured images are captured.

2. The information processing apparatus according to claim 1, wherein a 3D model of a subject in a real space is further placed in the three-dimensional space, the 3D model being based on captured images of the subject captured by a plurality of image capturing apparatuses.

3. The information processing apparatus according to claim 1, wherein the one or more processors execute the instructions to:
   select the at least one virtual sound source from among the one or more virtual sound sources based on the information specifying the virtual viewpoint; and
   output the sound data corresponding to the at least one virtual sound source selected.

4. The information processing apparatus according to claim 3, wherein the one or more processors execute the instructions to switch a method for selecting the at least one virtual sound source from among the one or more virtual sound sources according to whether a position of the virtual viewpoint is within a predetermined area.

5. The information processing apparatus according to claim 1, wherein the at least one virtual sound source is a virtual sound source selected from among the one or more virtual sound sources and present in a field of view of the virtual viewpoint.

6. The information processing apparatus according to claim 1, wherein the at least one virtual sound source is a virtual sound source selected from among the one or more virtual sound sources based on at least one of a position of the virtual viewpoint and a line-of-sight direction of the virtual viewpoint.

7. The information processing apparatus according to claim 1, wherein the one or more processors execute the instructions to output the sound data corresponding to one virtual sound source among a plurality of virtual sound sources placed in the three-dimensional space, and
   a direction from the virtual viewpoint toward the one virtual sound source is closer to a line-of-sight direction of the virtual viewpoint than a direction from the virtual viewpoint toward another virtual sound source, among the plurality of virtual sound sources, that is different from the one virtual sound source.

8. The information processing apparatus according to claim 1, wherein the one or more processors execute the instructions to output the sound data corresponding to one virtual sound source among a plurality of virtual sound sources placed in the three-dimensional space, and
   a distance from the virtual viewpoint to the one virtual sound source is shorter than a distance from the virtual viewpoint to another virtual sound source, among the plurality of virtual sound sources, that is different from the one virtual sound source.

9. The information processing apparatus according to claim 1, wherein the one or more processors execute the instructions to control the volume of the sound data corresponding to the at least one virtual sound source so as not to exceed the volume of the collected sound data collected when the captured images are captured.

10. The information processing apparatus according to claim 1, wherein the one or more processors execute the instructions to control a volume of the sound data corresponding to the at least one virtual sound source according to a distance between the virtual viewpoint and the at least one virtual sound source.

11. The information processing apparatus according to claim 1, wherein the one or more processors execute the instructions to control a volume of the output sound data when switching the output sound data from the sound data corresponding to a first virtual sound source among the one or more virtual sound sources to the sound data corresponding to a second virtual sound source among the one or more virtual sound sources.

12. The information processing apparatus according to claim 1, wherein the one or more processors execute the instructions to output the sound data corresponding to at least one virtual sound source selected from among the one or more virtual sound sources by a user.

13. The information processing apparatus according to claim 1, wherein at least one of the one or more virtual sound sources is associated with a model of an advertisement placed in the three-dimensional space.

14. The information processing apparatus according to claim 1, wherein at least one of the one or more virtual sound sources is not associated with a model placed in the three-dimensional space.

15. The information processing apparatus according to claim 1, wherein the sound data is data played back along with the virtual viewpoint image.

16. An information processing method comprising:
   obtaining information specifying a virtual viewpoint in a three-dimensional space in which one or more models and one or more virtual sound sources are placed;
   managing sound data corresponding to each of the one or more virtual sound sources;
   generating a virtual viewpoint image of the three-dimensional space based on the virtual viewpoint; and
   outputting the virtual viewpoint image and the sound data corresponding to a model, among the one or more models, that appears in the virtual viewpoint image and at least one virtual sound source among the one or more virtual sound sources, wherein:
   a 3D model based on captured images of a subject captured by a plurality of image capturing apparatuses in a real space is further placed in the three-dimensional space, and
   a volume of the sound data corresponding to the at least one virtual sound source is adjusted based on a volume of collected sound data collected when the captured images are captured.

17. A non-transitory computer-readable medium storing a program executable by a computer to perform a method comprising:
   obtaining information specifying a virtual viewpoint in a three-dimensional space in which one or more models and one or more virtual sound sources are placed;
   managing sound data corresponding to each of the one or more virtual sound sources;
   generating a virtual viewpoint image of the three-dimensional space based on the virtual viewpoint; and
   outputting the virtual viewpoint image and the sound data corresponding to a model, among the one or more models, that appears in the virtual viewpoint image and at least one virtual sound source among the one or more virtual sound sources, wherein:
   a 3D model based on captured images of a subject captured by a plurality of image capturing apparatuses in a real space is further placed in the three-dimensional space, and
   a volume of the sound data corresponding to the at least one virtual sound source is adjusted based on a volume of collected sound data collected when the captured images are captured.

* * * * *